US011141903B2

(12) United States Patent
Gneuss et al.

(10) Patent No.: US 11,141,903 B2
(45) Date of Patent: Oct. 12, 2021

(54) EXTRUDER SCREW FOR A MULTI-SCREW EXTRUDER FOR PLASTICS EXTRUSION

(71) Applicant: GNEUSS GMBH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

( * ) Notice: Subject to any disclaimer, the term of this patent is extended or adjusted under 35 U.S.C. 154(b) by 135 days.

(21) Appl. No.: 16/614,544

(22) PCT Filed: May 23, 2018

(86) PCT No.: PCT/DE2018/100497
§ 371 (c)(1),
(2) Date: Nov. 18, 2019

(87) PCT Pub. No.: WO2018/215028
PCT Pub. Date: Nov. 29, 2018

(65) Prior Publication Data
US 2020/0282369 A1 Sep. 10, 2020

(30) Foreign Application Priority Data
May 23, 2017 (DE) .................... 10 2017 111 275.8

(51) Int. Cl.
*B29C 48/76* (2019.01)
*B29C 48/425* (2019.01)
(Continued)

(52) U.S. Cl.
CPC ............ *B29C 48/766* (2019.02); *B01F 7/082* (2013.01); *B01F 7/088* (2013.01); *B01F 7/14* (2013.01);
(Continued)

(58) Field of Classification Search
CPC .. B01F 2215/0049; B01F 7/082; B01F 7/088; B01F 7/14; B29B 7/485; B29C 448/365;
(Continued)

(56) References Cited

U.S. PATENT DOCUMENTS 2,754,542 A * 7/1956 Henning ................. B29B 7/485
241/109
3,043,480 A * 7/1962 Wittrock ............... B30B 11/248
222/146.5

(Continued)

FOREIGN PATENT DOCUMENTS

WO 2013180941 A1 12/2013

OTHER PUBLICATIONS

International Search Report of Corresponding International Application No. PCT/DE2018/100497, Filed May 23, 2018.

*Primary Examiner* — Tony G Soohoo
(74) *Attorney, Agent, or Firm* — Muncy, Geissler, Olds & Lowe, P.C.

(57) ABSTRACT

An extruder screw for a multi-screw extruder for plastics extrusion includes: a feeding and metering zone for melting and homogenizing the plastic and an evacuating zone for carrying away gaseous constituents and a compressing and/or discharging zone; a multi-screw section, which has a plurality of planetary screws, which lie open on the outer circumference of the extruder screw, at least over part of their length; and a driving zone, in which the planetary screws engage by way of a toothing in an external toothing on a central shaft or in an internal toothing in a stator ring or in the inner wall of an extruder bore of the multi-screw extruder. The feeding and metering zone extends into the multi-screw section, wherein the respective part of the planetary screws that is lying in the metering zone is at least partially enclosed.

12 Claims, 5 Drawing Sheets

(51) Int. Cl.
  *B29C 48/435* (2019.01)
  *B29C 48/44* (2019.01)
  *B29C 48/375* (2019.01)
  *B01F 7/08* (2006.01)
  *B01F 7/14* (2006.01)
  *B29B 7/48* (2006.01)
  *B29C 48/365* (2019.01)

(52) U.S. Cl.
  CPC ............ *B29B 7/485* (2013.01); *B29C 48/387* (2019.02); *B29C 48/425* (2019.02); *B29C 48/435* (2019.02); *B29C 48/44* (2019.02); *B01F 2215/0049* (2013.01); *B29C 48/365* (2019.02)

(58) Field of Classification Search
  CPC ... B29C 48/387; B29C 48/766; B29C 48/425; B29C 48/435; B29C 48/44
  See application file for complete search history.

(56) References Cited

U.S. PATENT DOCUMENTS

| | | | | |
|---|---|---|---|---|
| 3,310,837 A * | 3/1967 | Wittrock | ................. | B29C 45/50 366/76.1 |
| 3,640,669 A * | 2/1972 | Hanslik | ................... | B29C 48/44 425/376.1 |
| 3,825,236 A * | 7/1974 | Hussmann | ............ | B29C 48/435 366/76.1 |
| 4,176,967 A * | 12/1979 | Brinkmann | ............. | B29C 48/67 366/83 |
| 4,268,176 A * | 5/1981 | Muller | ................... | B29C 48/435 366/83 |
| 4,289,409 A * | 9/1981 | Brand | ..................... | B29B 7/485 366/83 |
| 4,514,095 A * | 4/1985 | Ehrfeld | ............. | F16L 55/02718 138/42 |
| 4,591,487 A * | 5/1986 | Fritsch | .................... | B29B 7/481 422/134 |
| 4,773,654 A * | 9/1988 | Fritsch | .................... | B29C 48/84 277/348 |
| 4,889,430 A * | 12/1989 | Mueller | ................ | B29C 48/425 366/85 |
| 5,106,198 A * | 4/1992 | Muller | ................... | B29B 7/845 366/75 |
| 5,153,009 A * | 10/1992 | Voigt | ................... | B29C 48/2526 425/204 |
| 5,476,319 A * | 12/1995 | Blach | ........................ | B01F 7/14 366/83 |
| 5,510,073 A * | 4/1996 | Kaegi | ................... | B29C 48/252 264/211.23 |
| 5,836,682 A * | 11/1998 | Blach | ...................... | B29C 48/43 366/84 |
| 5,842,782 A * | 12/1998 | Lau | ........................ | B29B 7/485 366/85 |
| 5,887,977 A * | 3/1999 | Morikawa | ............ | B01F 5/0604 366/340 |
| 6,074,084 A * | 6/2000 | Kolossow | ............... | B29B 7/487 366/84 |
| 6,190,031 B1 * | 2/2001 | Blach | ...................... | B29C 48/83 366/75 |
| 6,705,753 B2 * | 3/2004 | Behling | ..................... | B29B 7/60 366/85 |
| 7,017,732 B2 * | 3/2006 | Uphus | ..................... | B29B 7/489 198/663 |
| 7,025,491 B2 * | 4/2006 | Blach | ...................... | B29C 48/44 366/85 |
| 7,080,935 B2 * | 7/2006 | Innerebner | ............ | B29C 48/435 366/85 |
| 7,354,188 B2 * | 4/2008 | Uphus | ................... | B29C 48/585 366/77 |
| 7,513,677 B2 * | 4/2009 | Gneuss | ................. | B29C 48/767 366/83 |
| 7,942,567 B2 * | 5/2011 | Ogawa | .................... | B29C 48/37 366/77 |
| 8,381,618 B2 * | 2/2013 | Blach | ...................... | B29C 48/252 74/665 GA |
| 9,102,091 B2 * | 8/2015 | Alsewailem | ............ | B01F 7/241 |
| 9,630,345 B2 * | 4/2017 | Alsewailem | ............ | B29B 7/428 |
| 10,112,320 B2 * | 10/2018 | Rust | ........................ | B29B 7/485 |
| 10,695,953 B2 * | 6/2020 | Clark | ...................... | B29B 13/00 |
| 2010/0067320 A1 * | 3/2010 | Blach | ...................... | B29B 7/489 366/85 |
| 2010/0151028 A1 * | 6/2010 | Ashworth | ............ | A61K 31/135 424/485 |
| 2014/0286121 A1 * | 9/2014 | Bosiers | ................... | B29C 48/37 366/144 |
| 2015/0118352 A1 * | 4/2015 | Visscher | ................. | B29B 7/485 426/3 |
| 2019/0047199 A1 * | 2/2019 | Douglas | ................ | B29C 48/385 |
| 2019/0085483 A1 * | 3/2019 | Clark | ........................ | D01D 5/08 |
| 2020/0282369 A1 * | 9/2020 | Gneuss | ................. | B29B 7/485 |
| 2020/0399786 A1 * | 12/2020 | Williams | ................ | C08J 11/16 |

* cited by examiner

EXTRUDER SCREW FOR A MULTI-SCREW EXTRUDER FOR PLASTICS EXTRUSION

INTRODUCTION

The invention relates to an extruder screw for a multi-screw extruder for plastics extrusion with the features of the preamble of claim 1.

BACKGROUND

Such a multiscrew extruder is used to obtain a homogeneous plastic melt from solid plastic particles, in particular polyester granulate, and is known from the applicant's patent documentation EP 1434680 B1. With this type of extruder, several planetary screws are provided in the degassing zone. The chamber volumes of the planetary screws in the area of the degassing zone are not completely filled during operation of the multiscrew extruder, so that a correspondingly large surface area of the plastic is formed, which facilitates degassing. Subsequently, the partial strands of the plastic melt are reunited in a discharge and/or compression zone and passed on, for example to a downstream melt pump.

The difficulty in using the well-known multiscrew extruder lies in optimizing the numerous operating parameters such as drive and melting performance, mass temperature and residence time in the metering zone. An excessively high mass temperature can lead to disadvantageous changes in the plastic, whereas a low mass temperature leads to insufficient melting of the solids in the metering zone. Although a long residence time promotes melting and homogenization, it accelerates the hydrolytic degradation of the plastic, which still contains moisture in this phase.

This optimization is particularly difficult if the solids comprise recycled goods and therefore have an inhomogeneous melting behavior. In this case, it is possible that solid parts have not yet been sufficiently melted when they reach the multiscrew section. Since the planetary screws in the multiscrew section are mounted floating in the plastic melt, any solid residues potentially carried along in the melt are pressed through the bearing points of the planetary screws and increase the wear of the planetary screws and bearings.

The object of the present invention is therefore to improve an extruder screw of the type mentioned above in such a way that a homogeneously molten melt is achieved with only a short residence time until the degassing zone is reached.

SUMMARY OF THE INVENTION

This object is solved according to the invention by a multiscrew extruder with the features of claim 1.

According to the invention, a continuous transition is created from an inlet pipe, fed for example by an upstream extruder or a pump, and/or by an upstream mono-screw to the multiscrew section by forming a taper section there to provide a diameter transition between the inlet and the multiscrew section. The taper section can be cone-section-shaped or—seen in cross-section—concave or convexly curved. It is only essential that the melt fed via the inlet is fanned out and fed to the individual inlet bores for the planetary screws arranged in the taper section.

The idea essential to the invention is not to carry out melting and homogenizing, so-called metering, upstream, but to extend it into the multiscrew section.

The metering zone thus comprises an inlet with a smaller diameter, a taper section for strand expansion and for strand splitting into several partial strands and the continuation of the partial strands via several planetary screws until the degassing zone is reached.

While in the prior art the structurally separated sections each also had certain functions, it is now provided to fulfil two functions simultaneously with the same planetary screws in one structural section, namely in the multiscrew section, and on the other hand to distribute one function, namely melting and homogenizing, over at least two structural sections.

The part of the metering zone formed in the inlet can only be short according to the invention or even be omitted, so that the residence time there is reduced. The direct subsequent division into a plurality of individual strands increases the contact area of the melt to the extruder screw, so that the melt conveyed in the individual strands can be temperature-controlled well. In particular, cooling of the melt is also possible.

Since not only the ends of the planetary screws are embedded in the bores of a receiving element, but also the portion of the metering zone in the multiscrew section extends over at least about a quarter of the length of the planetary screws, correspondingly long flow channels each with a small cross-section are thus created, enabling good temperature control and homogenization.

Due to the fact that the planetary screws themselves run at a multiple of the extruder screw speed based on the given diameter ratios, the residence times in the longitudinal part of the metering zone within the multiscrew section are short, but can still be varied, for example, by the pitch of the planetary screws in the enclosed area.

Regarding the mode of operation of the multiscrew extruder according to the invention, it should also be pointed out that the chambers in the completely enclosed longitudinal areas of the planetary screws are preferably operated fully filled according to the invention, so that a good conveying effect is achieved. As a result of the subsequent, pressureless degassing zone, there is no back pressure and the melt components, which are only partially melted in the upstream equipment, can be drawn in well.

The drive zone can, as is generally known, be provided at the discharge end of the planetary screws. For this purpose, the planetary screws are provided with a pinion at their rear end or in an area close to the rear end, respectively, or are connected to such a pinion. The pinions engage in an internal toothing in the wall of the extruder bore so that the planetary screws are driven synchronously.

However, it is particularly preferable to arrange the drive zone where the functional separation is located at the planetary screws, i.e., where the completely enclosed parts of the planetary screws end with the metering zone and pass into the open areas of the degassing zone. The arrangement at this point, has the advantage that the drive torque required on the planetary screws mainly for melting and homogenization in the longitudinal portion of the multiscrew section can be directly introduced. A torsion of the thin planetary screw shafts over their entire length between intake and discharge is avoided by such an arrangement of the drive zone in the middle of the length or even further forward. The respective longitudinal downstream sections of the planetary screw shafts in the multiscrew section, although longer, are hardly stressed because the screws in the degassing zone are only partially filled and therefore only low torques are required.

It should be pointed out that the arrangement of the drive zone does not necessarily have to be situated exactly at the transition between two functional zones, but can also overlap with at least one of the adjacent zones, since the melt is already conducted via the toothing in the drive zone.

Since significantly more torque has to be applied for the planetary screws in the multiscrew extruder according to the invention than in the prior art, where the planetary screws only convey completely molten melt in partially filled chambers for the purpose of venting, the torques to be transmitted are significantly higher, so that it is also advantageous to provide the drive pinions as well as the associated toothing on a stator ring or directly in the extruder bore with helical toothing.

A preferred embodiment is to provide the multiscrew section as part of a uniformly driven extruder screw, wherein a mono-screw section is provided in the inlet and/or outlet. In this case, the metering zone is divided into a portion represented by an upstream mono-screw and the portion in the multiscrew section. This design also has the advantage that the mono-screw section can be shorter than in the prior art, so that the residence time is reduced. An advantage of the extruder screw according to the invention is that a higher drive power can be provided in the mono-screw section right at the beginning of processing, which leads to faster melting. Local overheating, however, is avoided because the immediate subsequent fanning into individual strands across the taper section into the multiscrew section provides greater cooling capacity and thus avoid thermal damage.

The invention will be explained in more detail below with reference to the drawings. The Figures show in detail:

BRIEF DESCRIPTION

DETAILED DESCRIPTION

Figure 1:
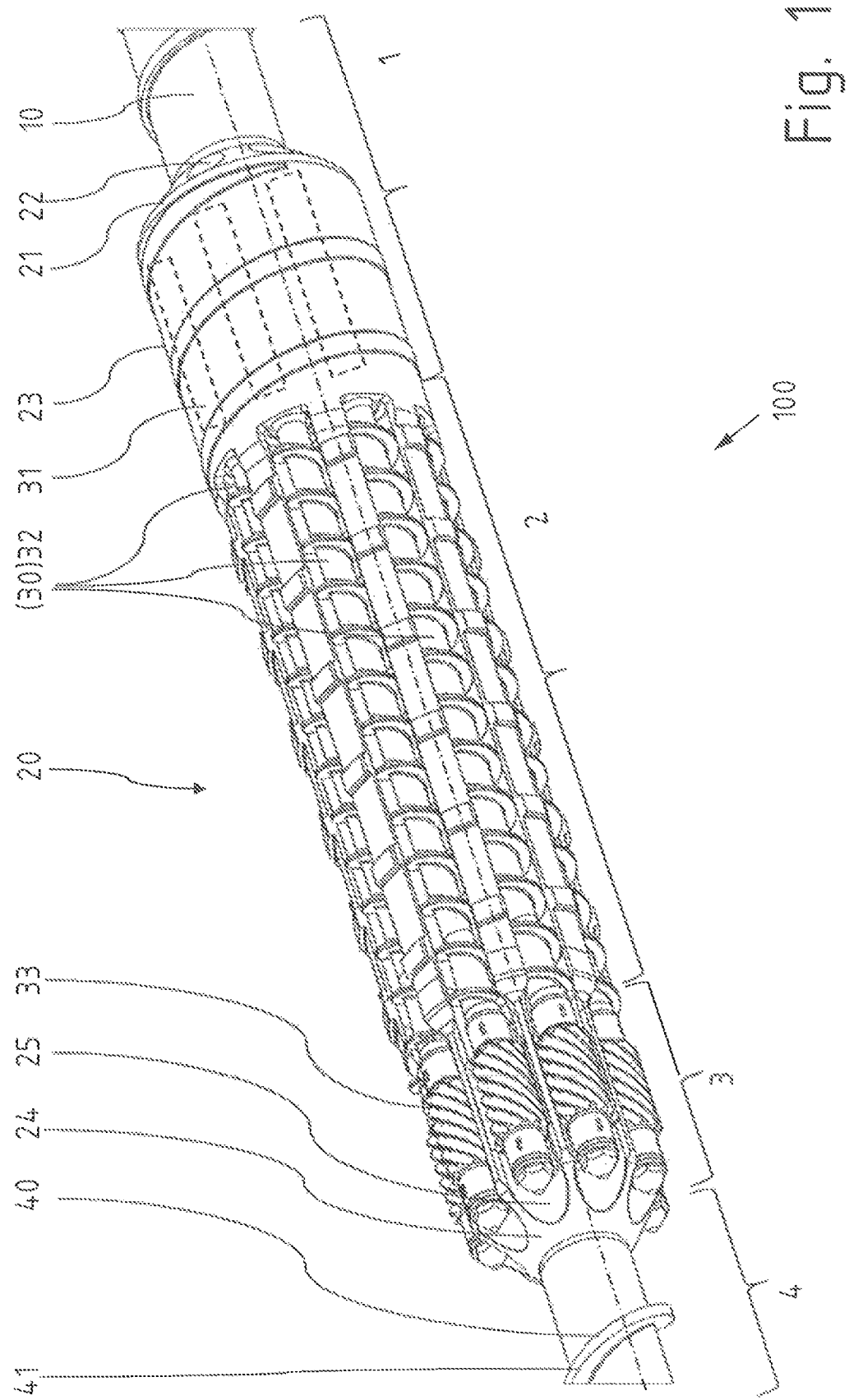
FIG. 1 shows parts of an extruder screw for a multi screw extruder according to the invention according to a first embodiment, in perspective view.

FIG. 1 shows a section of an extruder screw 100 in perspective view, as far as essential for the invention. Plastic particles or plastic melt, respectively, are drawn in from the right in the position shown in FIG. 1 and discharged to the left.

Four function zones are provided across the length:
A first longitudinal section after the intake, not visible here, forms the so-called metering zone 1, in which the plastic granulate is melted and homogenized.
A degassing zone 2 follows. A suction device is provided on the extruder housing, which is also not shown here, so that volatile components can be extracted from the degassing zone 2.
The melt melted in metering zone 1 and degassed in the subsequent degassing zone 2 must pass through a drive zone 3 and is compressed and discharged in a compression and/or discharge zone 4 behind it.

From a design point of view, the extruder screw 100 is essentially divided into three sections:
a first mono-screw section 10;
a multiscrew section 20 with a plurality of planetary screws 30; and
a second mono-screw section 40.

The mono-screw sections 10, 40 and the multiscrew section 20 are preferably designed as separate elements, which are connected to each other to form a uniform extruder screw shaft 100. This simplifies production and makes it easier and more cost-effective to replace individual sections in the event of wear.

At the transition from the first mono-screw section 10 to the multi screw section 20, a planetary screw housing 23 is formed with a taper section 21, which has at least one planetary screw bore 22 per planetary screw 30.

The taper section 21 and the planetary screw housing 23 form a first longitudinal section of the multiscrew section 20, which is associated with metering zone 1. The planetary screw bores 22 continue in deep flow channels inside the planetary screw housing 23. The planetary screws 30 are completely enclosed here over a partial section 31, whereas a larger proportion of the section 32 of the planetary screws 30 lies open in the subsequent degassing zone 2. The ratio between the enclosed longitudinal section 31 and the open longitudinal section 32 of the planetary screws 30 is about 1:2 to 1:4 in the exemplary embodiment shown here. This length ratio is selected specifically according to the raw material to be processed in order to achieve the most homogeneous melting possible in the metering zone 1 on the one hand and to be able to carry out effective degassing on the other hand.

At least one screw helix is formed on the outer circumference of the taper section 21 and/or the planetary screw housing 23, so that the melt supplied by the monoscrew section 10 is not only distributed to the individual planetary screws 30, but is also partly conveyed over the outer circumference of the taper section 21. The liquid melt provides lubrication for the extruder screw 100 relative to the bore in the extruder housing.

At the rear, discharge end, the planetary screws 30 are each equipped with a pinion 33. The ends of the planetary screws 30 are mounted floating in bearing receptacles 25 of a support bearing 24. This extends via a further taper section into a second mono-screw section 40 with a discharge screw 41 that forms a compression and/or discharge zone 4.

The toothing of the pinion 31 can be designed as spur or helical toothing: With helical toothing, it is advantageous to select the pitch in the same direction of rotation as the pitch of the screw web of the planetary screws 30. This achieves an additional promotional effect. This supports the discharge from the multiscrew section 20 when the pinion 31 is arranged at the end.

While the planetary screws 30 are fully filled in the planetary screw housing 23, a free volume is required in the open degassing zone 2. Since in this part the planetary screws 30 are not fully encased and therefore the conveying effect decreases, a significant increase of the thread depth by at least a factor of 2 must take place in order to obtain an acceptable degassing result. In practice, significantly higher values have been proven. A ratio of 4 already results in a significant improvement of the degassing performance. The best results can be achieved with thread depth ratios of the thread depth in degassing zone 2 to the thread depth in metering zone 1 greater than 5:1.

Figure 2:
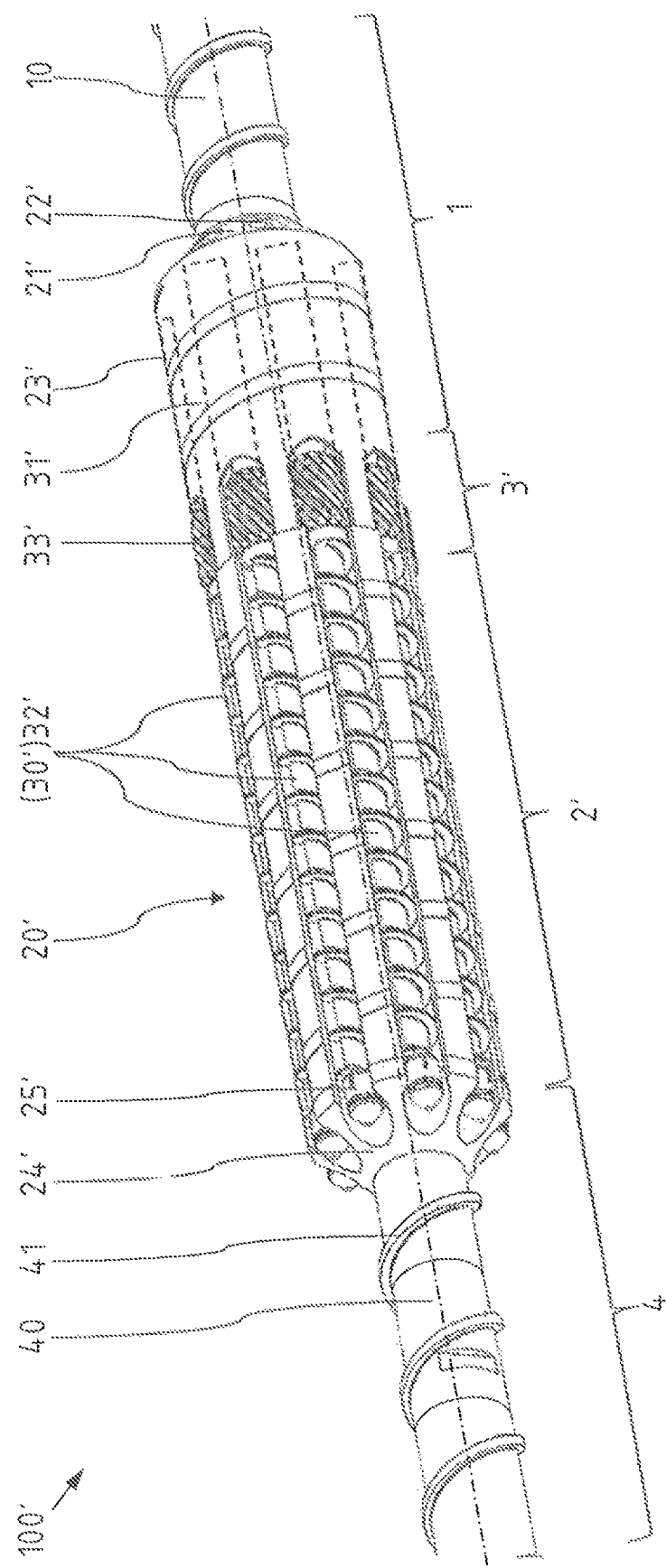
FIG. 2 shows parts of an extruder screw according to a second embodiment, in perspective view.

FIG. 2 shows a section of a second embodiment of an extruder screw 100' according to the invention in a perspective view. As with the first embodiment, three essential design sections are provided:
the first mono-screw section 10;
a multiscrew section 20' with a plurality of planetary screws 30', which are mounted on the intake side in a planetary screw housing 23' having a taper section 21' and inlet bores 22' and are supported in a support bearing 24' on the discharge side; and the second mono-screw section 40 having the discharge screw 41.

The functional division of the extruder screw 100' also comprises the four zones:

a metering zone 1',
a degassing zone 2';
a drive zone 3'; and
a compression and/or discharge zone 4'.

However, the sequential arrangement of the second embodiment is different; the drive zone 3' is positioned between the metering zone 1' and the degassing zone 2'. For this purpose, pinions 33' are formed or mounted directly where the planetary screws 30' emerge from the planetary screw housing 23' with their longitudinal section 31' which is to be associated with the metering zone 1'. The longitudinal section 32' of the planetary screw 30' located behind the pinions 33' in the direction of flow is to be associated with the degassing zone 2'. The discharge-side tips of the planetary screws 30' are mounted in ring-shaped bearing receptacles 25' of the support bearing 24'.

When the pinion 33' is arranged in the center or in the front third of the length of the planetary screw shafts 30, a helical toothing can support the conveyance into the degassing zone 2. If the total thread volume of the toothing, which is calculated as the product of the free area and the thread pitch, is selected in such a way that it is similar to the thread volume in the planetary screw part, plastification can even be supported at the same time.

It is particularly advantageous if the helix angle of the toothing is selected at least in such a way that the resulting pitch is at least as large as the pitch of the planetary screws, in particular at least 1.5 times the pitch.

Figure 3:
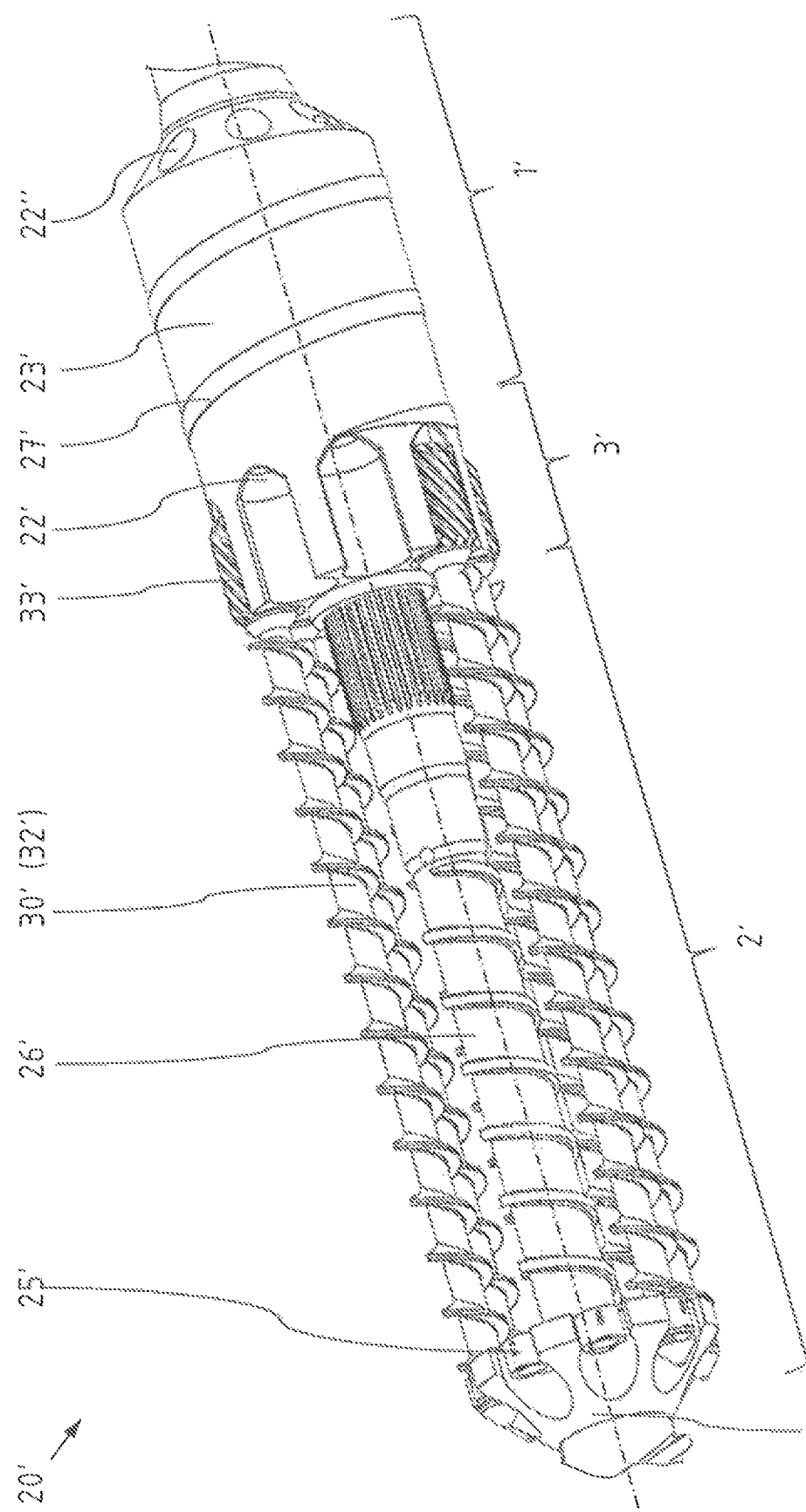
FIG. 3 shows parts of the extruder screw according to FIG. 2, in perspective view.

FIG. 3 shows the multiscrew section 20' of the extruder screw 100' in an enlarged perspective view, wherein two of the total of eight planetary screws 30' have been removed in order to provide a view of an internal central shaft 26' around which the rotating planetary screws 30' are arranged. In its discharge end section, the central shaft 26' is equipped with a cooling spiral as part of the internal cooling.

Figure 4:
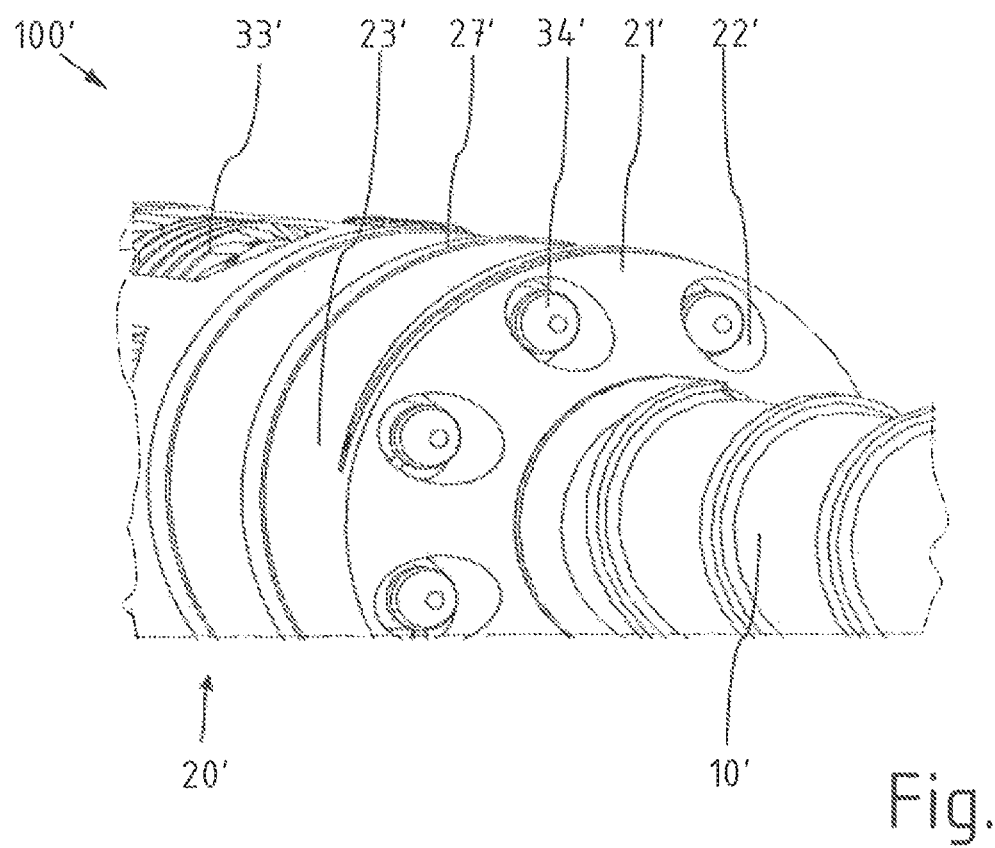
FIG. 4 shows a detail of the extruder screw according to FIG. 2, in perspective view.

FIG. 4 shows a perspective view looking at the front side of the taper section 21' of the multiscrew section 20' from the monoscrew section 10'. In the planetary screw bores 22' of the planetary screw housing 23', tips 34' of the planetary screws 30' can be recognized. In the planetary screw housing 23', the planetary screws 30' are initially completely enclosed and are exposed again only in the drive zone, where the pinions 33' are arranged. The outer circumference of the planetary screw housing 23' has a screw web 27' with low web height on the outer circumference.

Figure 5:
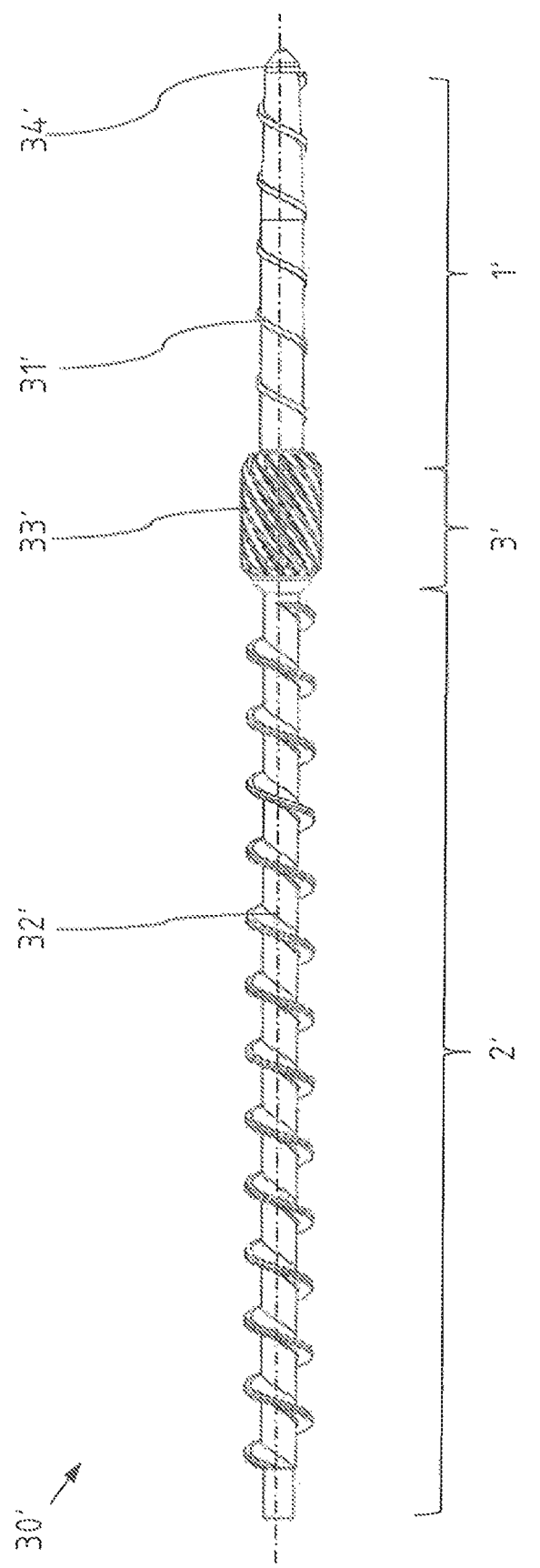
FIG. 5 is a planetary screw of the second embodiment of the extruder screw, in lateral view.

FIG. 5 shows a single planetary screw 30' in side view. Starting from a tip 34' there is first longitudinal section 31' of the planetary screw 30', which has a low web height. This part, which is associated with the metering zone 1', is guided within the planetary screw bores 22' (see FIG. 4). This is followed by a section that belongs to the drive section 3' and is formed to accommodate a pinion 33' or has a directly integrated toothing. The core diameter of the screw is reduced, and the web height correspondingly increased in a discharge end section, which accounts for about two thirds of the total length and is associated with the degassing zone 2'. The chamber volume is increased compared to the longitudinal section 31', so as to achieve only partial filling of the chambers in the longitudinal section 32', so that a good degassing effect is achieved, largely independent of the pitch in the sections 31', 32'.

The invention claimed is:

1. An extruder screw for a multiscrew extruder for plastics extrusion, comprising:
   an intake and metering zone for melting and homogenizing the plastic and a degassing zone for discharging gaseous components and a compression and/or discharge zone;
   a multiscrew section comprising a plurality of planetary screws which are exposed over at least part of their length at the outer periphery of the extruder screw; and
   a drive zone wherein the planetary screws engage via a toothing in at least one of:
      an external toothing on a central shaft;
      an internal toothing in a stator ring; and
      an inner wall of an extruder bore of the multiscrew extruder;
   wherein the intake and metering zone extends into the multiscrew section, the respective part of the planetary screws at least partially enclosed in the metering zone.

2. An extruder screw according to claim 1, wherein the intake and metering zone comprises a monoscrew section, the intake and metering zone extending from the monoscrew section into the multiscrew section.

3. An extruder screw according to claim 2, wherein the central shaft of the multiscrew section and the monoscrew section are designed as part of a uniform extruder screw.

4. An extruder screw according to claim 2, wherein the rotor shaft of the multiscrew section and the monoscrew section are each formed as separate extruder screw sub-elements that are detachably connected to one another.

5. An extruder screw according to claim 1, wherein downstream of the multiscrew section, seen in the flow direction, the compression and/or discharge zone is provided which zone is formed as a monoscrew section.

6. An extruder screw according to claim 1, wherein a taper section is formed at the beginning of the multiscrew section, the taper section having at least one planetary screw bore per planetary screw, and wherein the metering zone extends across the taper section into a planetary screw housing in the multiscrew section, in which the planetary screws are enclosed over at least part of their length.

7. An extruder screw according to claim 1, wherein the drive zone is arranged at the rear end of the multiscrew section.

8. An extruder screw according to claim 1, wherein the drive zone is arranged inside the multiscrew section, between the metering zone and the degassing zone.

9. An extruder screw according to claim 1, wherein the outer circumference of the planetary screw housing is provided with at least one screw web and can be overflowed.

10. An extruder screw according to claim 1, wherein the intake and metering zone comprises a pipe arranged upstream of the multiscrew section and connected to a pump.

11. An extruder screw according to claim 1, wherein the compression and/or discharge zone comprises a pipe arranged downstream of the multiscrew section, which is connected to a pump.

12. A multiscrew extruder for plastics extrusion, at least comprising an extruder housing having an extruder bore for receiving an extruder screw according to claim 1.

* * * * *